United States Patent [19]

Beck et al.

[11] Patent Number: 4,813,828
[45] Date of Patent: Mar. 21, 1989

[54] BOTTLE BORING MILLING TOOL

[75] Inventors: Hans W. Beck; Siegmar Nikstat, both of Sinsheim, Fed. Rep. of Germany

[73] Assignee: GTE Valenite Corporation, Troy, Mich.

[21] Appl. No.: 125,976

[22] Filed: Nov. 27, 1987

[51] Int. Cl.⁴ ............................................. B23C 0/00
[52] U.S. Cl. .................................. 409/132; 409/175; 409/235
[58] Field of Search .................. 409/235, 175, 132

[56] References Cited

U.S. PATENT DOCUMENTS

| | | | |
|---|---|---|---|
| 3,212,405 | 10/1965 | Smith | 409/132 |
| 3,543,635 | 12/1970 | Galbarini et al. | 409/132 |
| 3,709,095 | 1/1973 | Laumer | 409/132 |
| 3,882,640 | 5/1975 | Watt | 409/175 |
| 3,930,301 | 1/1976 | Wagner | 409/235 |
| 4,606,684 | 8/1986 | Shaturov et al. | 409/132 |
| 4,692,989 | 9/1987 | Neubauer | 409/132 |

*Primary Examiner*—Léon Scott, Jr.
*Attorney, Agent, or Firm*—David J. Koris

[57] ABSTRACT

A method for machining an enlarged profiled bore in a workpiece utilizing a numerically controlled machine and particularly a tool comprising a boring bar rotatable and axially displaceable relative to the workpiece. The milling cutter is eccentrically mounted in the boring bar thereby facilitating radial movement of the milling cutter. The milling cutter is adapted to follow a predetermined contour during removal of the boring bar from the workpiece thereby to form a correspondingly profiled bore.

5 Claims, 3 Drawing Sheets

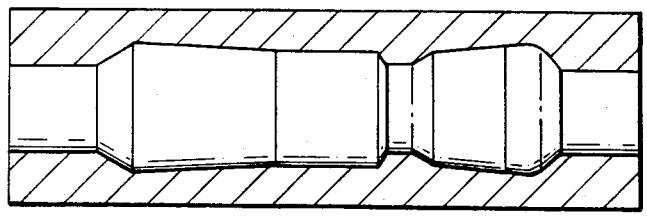
FIG. 3
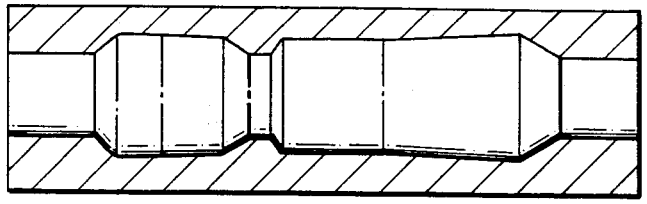
FIG. 4
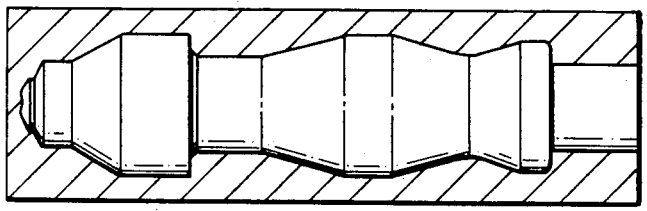
FIG. 5
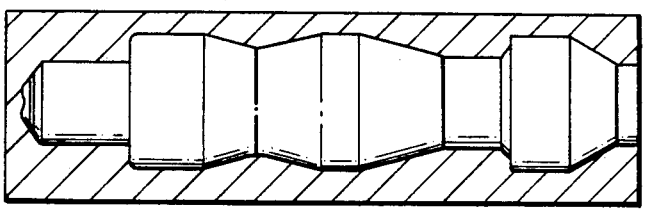
FIG. 6
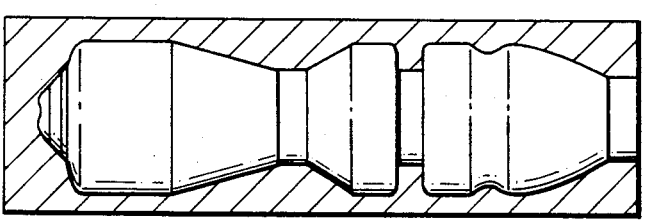
FIG. 7
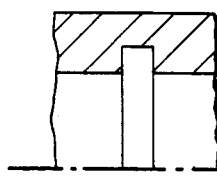 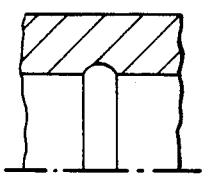 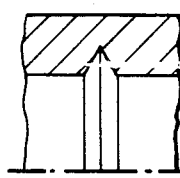 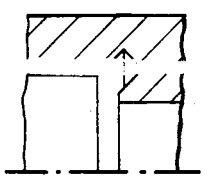
FIG. 8   FIG. 9   FIG. 10   FIG. 11

BOTTLE BORING MILLING TOOL

FIELD OF THE INVENTION

The present invention relates to the field of bottle boring tools and more particularly to a method of milling bottle bores utilizing a milling cutter radially offset from the boring bar.

BACKGROUND OF THE INVENTION

The invention relates to a method for machining a bore in a workpiece utilizing a numerically controlled machine tool. The tool comprises a boring bar rotatable and axially displaceable relative to the workpiece and a milling cutter rotatably mounted in the boring bar, the milling cutter having an axis of rotation radially offset with respect to the axis of the boring bar.

A tool of this type is disclosed in an article "Frasbohren und andere Bohrtechnologien" in the periodical "tz fur Metallbearbeitung", 81st annual, 1987, issue 3/87, pages 21, 22. The "bottle boring milling" tool shown therein comprises a rotating milling cutter mounted to the forward end of the stationary boring bar such that the milling cutter removes material from the workpiece in the area of the bore center when the boring bar is moved into the rotating workpiece. The boring cutting edge provided at the boring bar provides for the finish-machining. One advantage of this device which combines milling and boring operations resides in the fact that relatively short chips result ensuring good chip control. Furthermore, sufficiently high cutting speeds across the whole bore bottom are obtained. However, this bore milling tool is not capable of making profiled bores, i.e., bottle bores.

Applicant's German patent application No. 34 10 967 discloses a tool for making enlarged profiled bores. The application discloses a tool which comprises a rotating boring head having a plurality of circumferentially spaced cutting members adapted to be radially adjusted during the cutting operation by means of a single adjusting device. The tool involves merely a boring operation providing relatively long chips which may cause problems as to chip control. This may detrimentally affect both operational reliability and service life.

It is a primary object of the present invention to provide a tool adapted to make enlarged profiled bores while ensuring good chip control.

To this end, a tool of the above-defined type is characterized according to the present invention in that the milling cutter is mounted for radial movements relative to the boring bar.

Preferably, the milling cutter has cutting edges facing in the direction of removal of the boring bar and radially projecting beyond the outer periphery of the boring bar when the milling cutter is in its operative position.

The tool of the present invention allows both for axial and radial movements of the cutting edges of the milling cutter along a pair of NC axes. Said axial movements result from axial movements of the boring bar while said radial movements result from radial movements of the milling cutter relative to the boring bar. The tool is adapted to follow a profiled contour when the boring bar is removed from a preformed bore of the workpiece, with the milling cutter providing for the finish-machining of the profiled bore. Using a milling cutter results in relatively short chips ensuring good chip control. High operational reliability and long service life result therefrom.

Preferably, the boring bar is stationary while the workpiece rotates. However, relative movement between the boring bar and the workpiece could be obtained by making the boring bar rotate and holding the workpiece stationary.

The radial movements of the milling cutter relative to the boring bar are obtained either by means of an eccentric spindle having an axis of rotation radially offset relative to the axis of the boring bar and rotatable in the boring bar, or by means of a slide which is mounted to the boring bar such as to be radially movable relative thereto. An example of the invention will now be described with reference to the drawings, in which:

FIG. 3–11 shows various shapes of bores which may be formed by the tool of FIG. 1 and 2.

Figure 1:
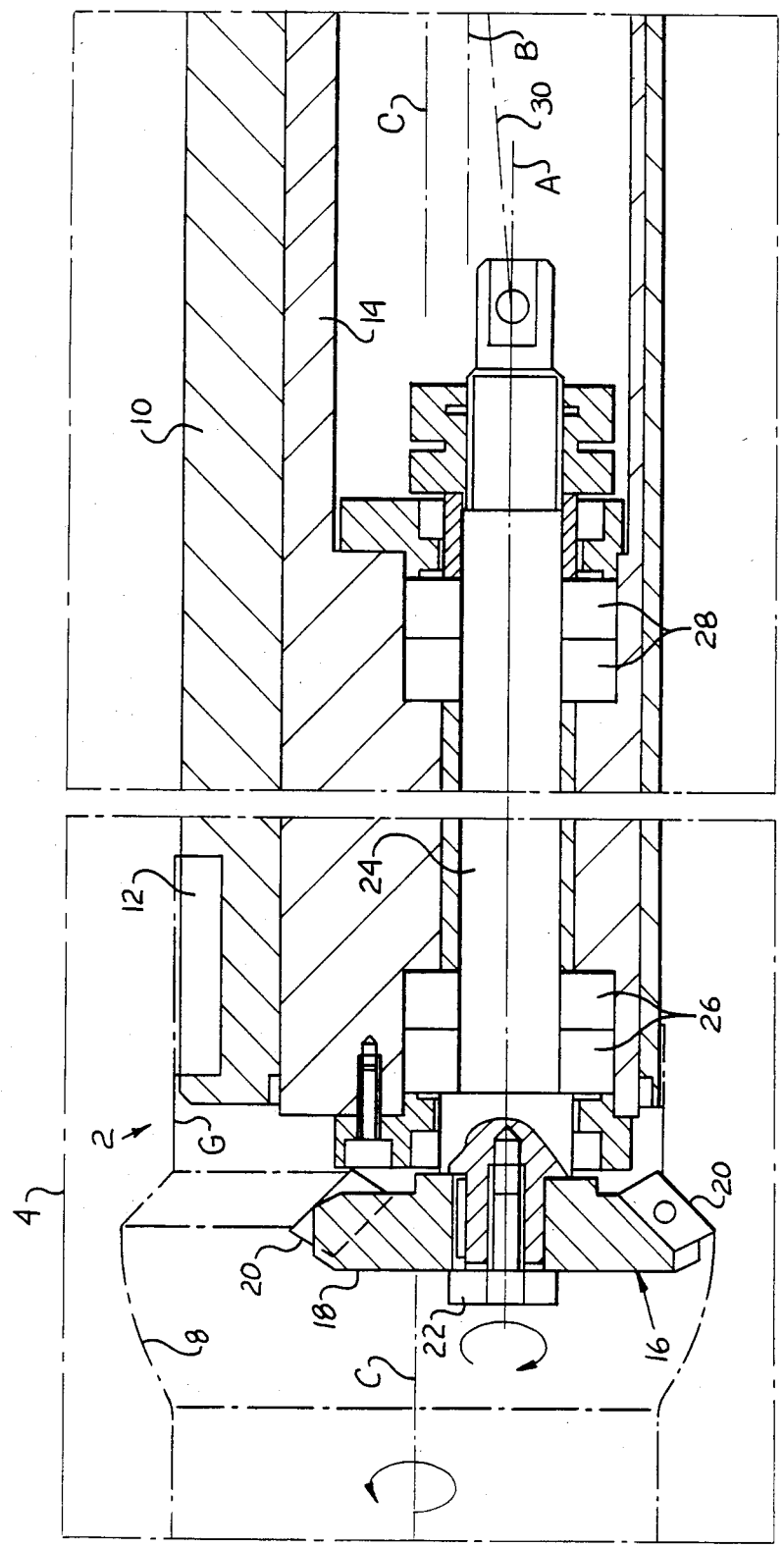
FIG. 1 is a longitudinal cross section of a bottle boring milling tool for making an enlarged profiled bore according to the present invention.
Figure 2:
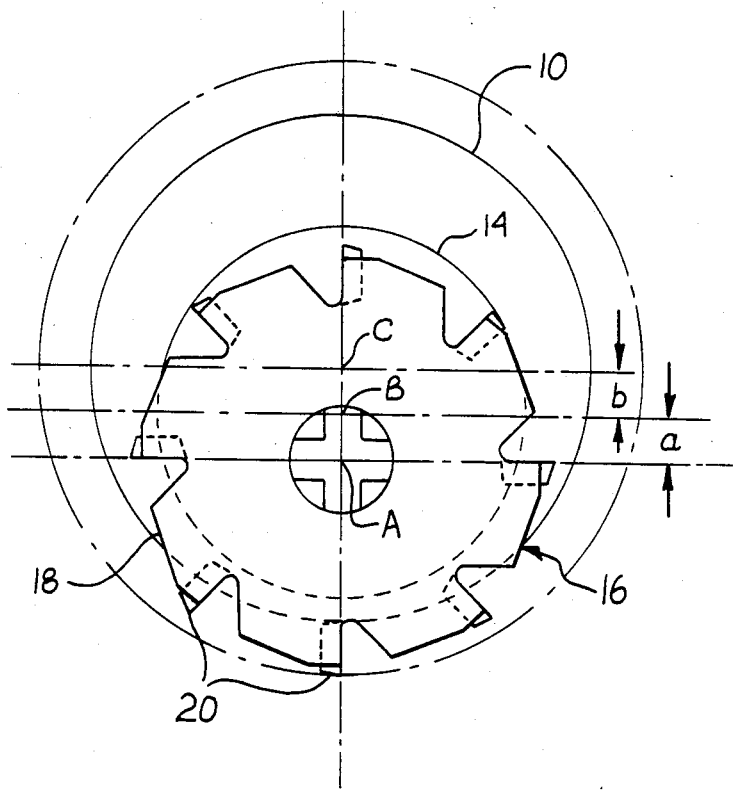
FIG. 2 is a transverse cross section of the tool of FIG. 1.

Tool 2, shown in FIG. 1 and 2, is adapted to machine a bore in a workpiece 4 schematically shown in FIG. 1 by dash-dotted lines. More precisely, tool 2 serves to enlarge a preformed cylindrical bore 6 such that it obtains a profiled contour.

For explanatory purposes a plurality of workpieces 4a to 4i having differently shaped bores which may be machined by tool 2 of FIG. 1, 2 are shown in FIG. 3.

Tool 2 comprises a boring bar 10 provided with a plurality of circumferentially spaced guide members 12 for guiding boring bar 10 in cylindrical bore 6. Workpiece 4 and boring bar 10 are rotatable and axially displaceable relative to each other. Preferably, boring bar 10 is stationary while workpiece 4 rotates; as an alternative workpiece 4 could be stationary while boring bar 10 rotates.

An eccentric spindle 14 is rotatably mounted in an eccentric bore of boring bar 10. Eccentric spindle 14 eccentrically receives a milling cutter 16.

Milling cutter 16 comprises a milling head 18 projecting from the forward end of boring bar 10 and eccentric spindle 14, and including a plurality of circumferentially spaced cutting members 20 provided with cutting edges facing away from the forward end of tool 2 (to the right in FIG. 1). Milling head 18 is fixed by means of a bolt 22 to a drive spindle 24 which is eccentrically mounted in eccentric spindle 14 by means of bearinqs 26 and 28. Drive spindle 24 is connected via a (schematically indicated) cardan shaft 30 to a drive shaft (not shown) which is rotatably driven by a drive (also not shown).

As may be seen from FIG. 1 and 2, the axis A of drive spindle 24 and accordingly the axis of rotation of milling cutter 16 are radially offset relative to the axis of B of eccentric spindle 14 by a distance a, while axis B is radially offset relative to the axis C of boring bar 10 by a distance b as is shown in FIG. 2. If eccentric spindle 14 is rotated by adjusting means (not shown) in boring bar 10, the radial spacing between the axis of rotation A of milling cutter 16 and the axis C or boring bar 10 is changed; i.e., the cutting edges of milling cutter 16 are radially displaced relative to axis C or boring bar 10.

Operation of the tool as described is as follows: Initially milling cutter 16 is moved into its radially innermost position; to this end eccentric spindle 14 is rotated by the adjusting means (not shown) in boring bar 10. Thereafter boring bar 10, together with milling cutter 16, are moved into the performed cylindrical bore 6 of tool 4. Workpiece 4 and milling cutter 16 are driven such that they rotate about their axes C and A, respectively. In order to have milling cutter 16 from the profiled contour 8 both axial and radial movements of milling head 18 are required. To this end, boring bar 10, together with milling cutter 16, is moved in the direction of removal from bore 6 (to the right in FIG. 1) and simultaneously eccentric spindle 14 is rotated by the adjusting means (not shown) so that milling head 16 performs a radially outward movement relative to boring bar 10. In this manner, a profiled contour 8 is machined into workpiece 4.

We claim:

1. A method for machining an enlarged profile bore utilizing a tool having an axis of rotation, said tool including a boring bar rotatable and axially displaceable about said axis with a milling cutter rotatably mounted thereto, said milling cutter being mounted in an eccentric spindle having an axis of rotation radially offset with respect to the axis of said boring bar, said milling cutter being mounted to a drive means having an axis of rotation radially offset with respect to the axis of said spindle, said method comprising moving said milling cutter radially inward toward the axis of said boring bar by rotating said eccentric spindle in said boring bar, moving said boring bar into a preformed bore in the workpiece, rotating said eccentric spindle, causing said milling cutter to generate radially outward thereby exposing said milling cutter to said workpiece, and drawing said boring bar axially within said workpiece while radially generating said milling cutter to develop a profiled contour.

2. The method of claim 1 including radially generating said milling cutter beyond the outer diameter of the boring bar, rotating said drive means, and retracting said boring bar from said workpiece causing said mill cutter to engage said workpiece.

3. The method of claim 1 including translating rotatable cutting force to said milling cutter from said drive means through a cardan shaft.

4. The method of claim 1 including moving said milling cutter radially by means of a slide mounted to said boring bar.

5. A method for machining an enlarged profile bore utilizing a tool having an axis of rotation comprising: a boring bar rotatable and displaceable about said axis, said milling cutter being mounted in an eccentric spindle having an axis of rotation radially offset with respect to the axis of said boring bar, said milling cutter is mounted to a rotatable drive means having an axis of rotation radially offset with respect to the axis of said spindle, said method comprising the steps of moving said milling cutter radially inward toward said boring bar axis by rotating said eccentric spindle in said boring bar, moving said boring bar into a preformed bore in the workpiece, rotating said eccentric spindle within said bore, generating said milling cutter radially outward toward the workpiece, engaging said workpiece with said milling cutter by rotating said drive means, and generating said spindle within said boring bar while drawing said boring bar axially within said workpiece.

* * * * *